Sept. 12, 1933.   C. B. PERKINS   1,926,557
FILTER
Filed April 10, 1931
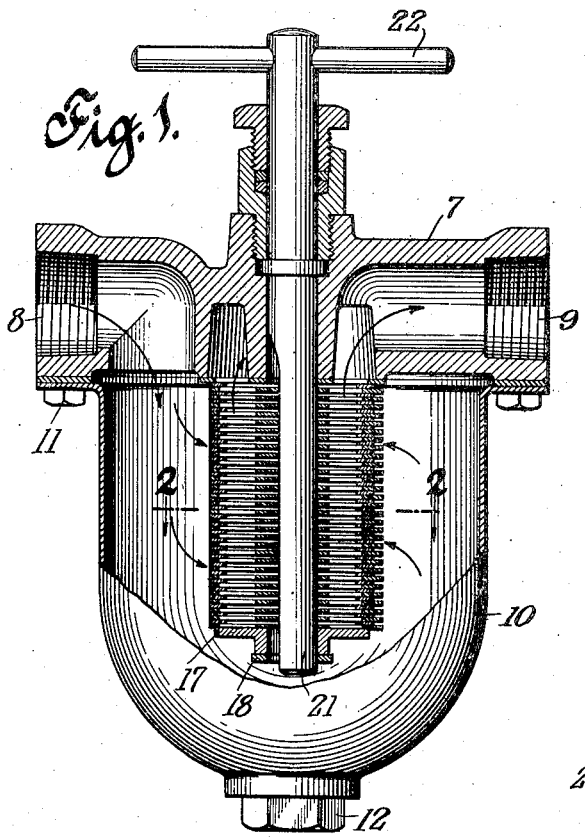
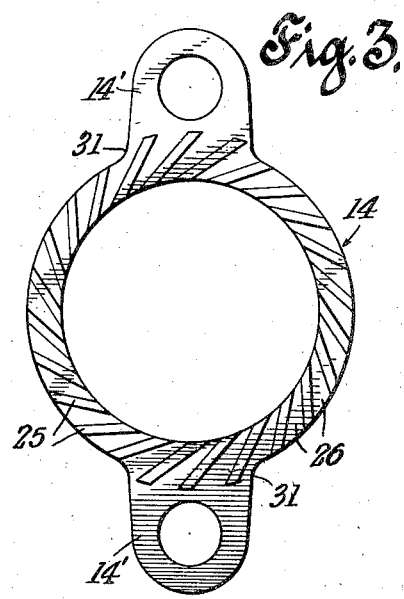
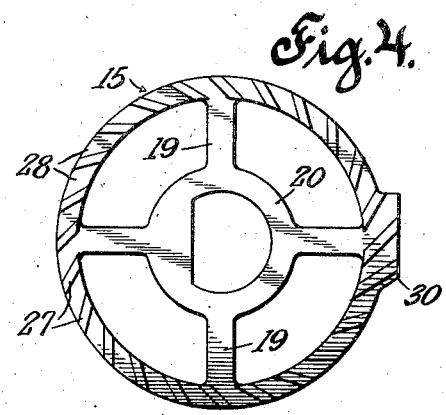
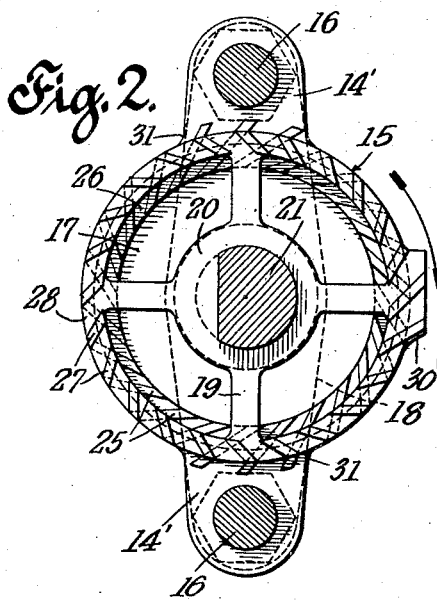
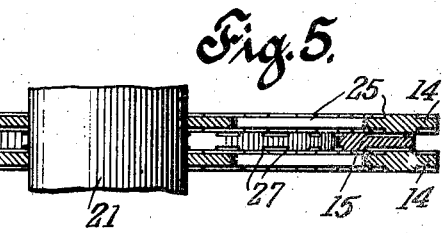
INVENTOR
Clarence B. Perkins
BY
ATTORNEY Patented Sept. 12, 1933

1,926,557

UNITED STATES PATENT OFFICE 1,926,557

FILTER

Clarence B. Perkins, Meriden, Conn., assignor to The Cuno Engineering Corporation, Meriden, Conn., a corporation of Connecticut Application April 10, 1931. Serial No. 529,039

13 Claims. (Cl. 210—167)

My invention relates to apparatus for filtering or straining fluids.

One object is to provide rugged and reliable apparatus having extremely small filtering passages which can be readily cleaned.

Another object is to provide a construction of the above character which can be made economically and which is durable.

Another object is to provide a cleanable type of filter which is simple but reliable.

According to my invention the filtering element is made up of two sets of annular plates or rings, one of which is movable with respect to the other. These rings, as they would be termed for convenience, are formed preferably of thin sheet metal and provided with shallow ribs extending more or less tangentially so as to provide very thin passages in a nonradial direction between the rings so that when one set of rings is rotated with respect to the other, any particles which may have collected in the grooves will be forced outwardly.

The coacting ribs on adjacent faces of the rings are inclined in opposite directions so as to provide a sort of scissors action when the rings are relatively rotated.

Fig. 1 is a vertical section and side elevation of one form of device embodying my invention.

Fig. 2 is a section on a larger scale showing two of the coacting rings in plan.

Figs. 3 and 4 are separate plan views of the two different types of rings.

Fig. 5 is a sectional view on a very much enlarged scale.

The construction shown is of a type especially suitable for production in small sizes, such for instance as for filtering gasoline or oil for use in connection with internal combustion motors and the like. This, however, is merely for the purpose of illustration as the invention is applicable to filtration of any fluid and may be embodied in various sizes and designs.

In the form shown there is a head 7 provided with an inlet 8, and an outlet 9. The cup-shaped body 10 is detachably secured to the head, for instance by screws or bolts 11, and constitutes a sump or collecting receptacle for the solid particles which do not pass through the filter. This receptacle may be provided with an outlet closed by a plug 12, in the usual manner, to facilitate cleaning.

The filtering unit is made up of a stack of alternating rings such as 14 and 15. Rings 14 are provided with ears 14' through which pass rods 16, by which they are secured to the head and held stationary. The bottom of the stack is closed by a plate 17, held in place by the crossbar 18, which is secured to the rods 16—16.

The rings 15 are in the form of spiders each having arms 19, connected to a hub portion 20, which is mounted on the shaft 21. This shaft has a portion which extends outside of the casing so that it may be rotated, for instance by the handle 22, or in any other suitable manner, either periodically or continuously.

Each ring 14 is provided with a series of thin or shallow ribs 25, extending at a substantial angle to the adjacent radii, and providing shallow grooves 26 between them. These ribs are provided on both sides of the rings. The intervening rings 15 are likewise provided with angularly disposed shallow ribs 27 having shallow passages or grooves 28, between them. The direction of inclination of the ribs on the rings 14, and 15, is reversed, however, as shown in Fig. 2.

The rings 15 are also provided with one or more projecting members 30, which extend beyond the periphery of the rings 14. The ears 14' which project outwardly from the rings 14, have cooperating abutments 31 for facilitating the cleaning action. Each rib preferably makes from about 45° to 90° to the radius of the ring adjacent its position.

When the parts are assembled and in action, liquid passes into the casing through the opening 8 and between the various rings through the inclined passages 26 and 28. On account of the fact that these passages are inclined instead of radial, it will be seen that no solid particle can get through unless it is of less thickness than a groove 26 or a groove 28. Anything larger than this will be caught by the intersecting ribs 25 and 27. To clean the filter, the rings 15 are rotated in the direction of the arrow of Fig. 2. Any particles which have lodged in the grooves between the ribs will be forced outwardly by the cam-like action of the intersecting ribs and will either fall off into the receptacle 10 or be wiped off by the action of the projections 30 and 31.

By reason of this construction there is almost no limit to the degree of filtration and purification which can be effected. The rings may be as thin as a hundredth or two hundredth of an inch, for instance, and the ribs 25 and 27 may be as thin even as one ten-thousandth of an inch. These ribs may be formed in any suitable manner, for instance, by etching or by plating or by die work. Although the invention is especially adapted to embodiment in very thin material and for an extremely fine degree of filtration I do not wish the invention to be considered as limited to any especial size.

While I have shown the apparatus in the form in which the liquid flows inwardly through the grooves between the plates and thence through the longitudinal passages provided by the openings in the rings and out through the exit 9, it should be understood that the invention might be applied to a device in which the liquid flows in the reverse direction. Although in the form shown the inlet and outlet passages are arranged in the head and the body of the casing is detachable, it should be understood that the invention is not limited to this form but that the inlet and outlet passages might be arranged in the receptacle part of the casing and the outlet communicating with the lower end of the cartridge rather than the upper, in which event the head might be detachable without disturbing the receptacle.

I claim:

1. In a filter, two sets of alternately arranged rings each having angularly disposed shallow ribs whose lines of direction intersect each other to provide a cam action when one set is rotated with respect to the other set, and means for supporting the rings of the respective sets so that one set can be rotated with respect to the other set.

2. A filter construction comprising a set of stationary rings, a set of rotatable rings alternating with the stationary rings, said stationary and rotatable rings having ribs on their adjacent faces leaving shallow flat passages between the ribs, the ribs on at least one set of rings being arranged at an angle between the respective tangents and radii of the rings, and means for supporting and enclosing the respective sets of rings and providing inlet and outlet passages for fluid to and from the rings.

3. In a filter, alternate stationary and rotatable rings each having angularly disposed ribs in contact with each other at all times and means for supporting the stationary and rotatable rings.

4. In a filter, two sets of permanently associated rings, one set being rotatable concentrically with the other set, each ring having a shallow rib on the side adjacent the ribs on the other, the ribs on one set of rings being arranged to cross the paths of the ribs on the other set of rings when one set is rotated with respect to the other set, and means for supporting and enclosing the respective sets of rings and admitting fluid to and from the same.

5. In a filter, alternate stationary and rotatable rings, the rotatable rings each bearing at least one projecting lug extending beyond the periphery of the stationary rings and coacting lugs carried by the stationary rings, and means for supporting the stationary and rotatable rings.

6. In a filter, a set of stationary rings, a set of rotatable rings alternating with the stationary rings, each set of rings having a series of ribs on faces adjacent the other set of rings leaving shallow passages, the ribs on the two sets of rings being oppositely inclined with respect to each other and means for supporting the stationary and rotatable rings.

7. In a filter, a set of stationary rings, a set of rotatable rings alternating therewith, each ring having a series of inclined ribs projecting toward the adjacent ring and each ring having at least one lug extending beyond the periphery of the ribs to coact with corresponding lugs on the adjacent rings and means for supporting the stationary and rotatable rings.

8. As an article of manufacture a filtering unit comprising a set of spaced rings having central openings, means for supporting said rings with their central openings in alignment to form a passage having an outlet at one end of the set, means for closing the opposite end of said passage, a second set of rings alternating with the rings of the first set and having passages therethrough in alignment with the passages through the rings of the first set, a rotatable control shaft connected to the rings of the second set for rotating said rings, each ring having a series of inclined ribs projecting toward the adjacent ring leaving shallow passages between the ribs, the ribs on the two sets of rings being oppositely inclined with respect to each other.

9. A filter unit as set forth in claim 8 in which each ring has at least one lug extending beyond the periphery of its ribs to coact with a corresponding lug on the adjacent ring.

10. A filter including a unit as set forth in claim 8, together with an enclosing casing having an inlet passage leading to the outer edges of the rings and having an outlet passage connected to the outlet from the passage through the rings.

11. A filter including a filtering unit as set forth in claim 9, together with an enclosing casing having an inlet to the outer edges of the filtering rings and having an outlet connected with the outlet from the passage through the rings.

12. A filter comprising a housing having an inlet and an outlet, a series of thin perforated plates supported in the housing with spaces between the respective plates, the perforations and the spaces forming passages communicating between the inlet and the outlet, said plates having projected spaced ribs inclined with respect to the radii of the plates, a central rotatable shaft supported in the housing, a series of cleaner members carried by said shaft and fitting between the plates and engaging the ribs, said cleaner members having lugs projecting beyond the periphery of the principal parts of the plates and said plates having projections coacting with said lugs for knocking off sludge removed by the cleaning action.

13. A filter comprising a housing having an inlet and an outlet, a series of thin plates supported in the housing with spaces between the plates and perforations through the plates forming passages for liquid from the inlet to the outlet, a central rotatable shaft mounted in the housing, a series of perforated rings carried by said shaft and alternating with the plates, said rings having spaced projecting ribs inclined with respect to the radii of the rings and engaging the adjacent surfaces of the respective plates, said plates and rings having outwardly projecting portions for knocking off collected sludge.

CLARENCE B. PERKINS.